(12) United States Patent
Scholten et al.

(10) Patent No.: US 8,323,437 B2
(45) Date of Patent: Dec. 4, 2012

(54) METHOD AND APPARATUS FOR THE CONTINUOUS PRODUCTION OF A MULTIAXIAL LAID SCRIM WEB

(75) Inventors: Friedhelm Scholten, Duisburg (DE); Klaus Szukat, Parcent (ES)

(73) Assignee: MD Fibertech Corporation, Sausalito, CA (US)

( * ) Notice: Subject to any disclaimer, the term of this patent is extended or adjusted under 35 U.S.C. 154(b) by 54 days.

(21) Appl. No.: 12/660,175

(22) Filed: Feb. 22, 2010

(65) Prior Publication Data

US 2010/0175817 A1    Jul. 15, 2010

Related U.S. Application Data

(63) Continuation of application No. PCT/DE2008/001212, filed on Jul. 25, 2008.

(30) Foreign Application Priority Data

Aug. 22, 2007    (DE) .................... 10 2007 039 685

(51) Int. Cl.
*B65H 81/00* (2006.01)
(52) U.S. Cl. ............. 156/190; 156/181; 156/184; 57/6; 57/11; 57/13
(58) Field of Classification Search ............ 57/6, 10–13; 156/176, 177, 178
See application file for complete search history.

(56) References Cited

U.S. PATENT DOCUMENTS

| | | | | |
|---|---|---|---|---|
| 4,295,905 A | * | 10/1981 | Bascom et al. | 156/174 |
| 4,658,716 A | * | 4/1987 | Boissevain | 100/38 |
| 5,826,314 A | * | 10/1998 | Aihara et al. | 26/88 |
| 7,744,712 B2 | * | 6/2010 | Chang et al. | 156/179 |
| 2005/0147775 A1 | | 7/2005 | Chien | |
| 2009/0056857 A1 | * | 3/2009 | Heinrich et al. | 156/162 |

FOREIGN PATENT DOCUMENTS

| | | | |
|---|---|---|---|
| DE | 10 2005 000115 A1 | | 3/2006 |
| DE | 102005000115 | * | 3/2006 |
| DE | 10 2006 012306 A1 | | 9/2007 |
| EP | 0 768 167 A | | 4/1997 |
| GB | 961 716 A | | 6/1964 |
| GB | 961716 | | 6/1964 |
| JP | 2003 221771 A | | 8/2003 |
| JP | 2003221771 A | * | 8/2003 |
| WO | WO 2008/014784 A | | 2/2008 |

* cited by examiner

*Primary Examiner* — Khanh P Nguyen
*Assistant Examiner* — Carson Gross
(74) *Attorney, Agent, or Firm* — Von Rohrscheidt Patents (57) ABSTRACT

A method and apparatus for the continuous production of a multiaxial laid scrim web (2) using at least one uniaxial laid scrim (4, 5), which is wound about a winding apparatus (3) for producing a substantially tubular multiaxial laid scrim (8). In order to provide a method that allows a multiaxial laid scrim web (2) to be produced in higher quality with higher speed, it is proposed according to the invention to apply the uniaxial laid scrim (4, 5) onto the winding apparatus (3) at least with portions of its surface and thereby transport it continuously through the winding apparatus into a feeding apparatus.

13 Claims, 3 Drawing Sheets

METHOD AND APPARATUS FOR THE CONTINUOUS PRODUCTION OF A MULTIAXIAL LAID SCRIM WEB

RELATED APPLICATIONS

This application claims priority from and incorporates by reference German patent application serial No. DE 10 2007 039 685.8, filed on Aug. 22, 2007 and International patent application serial No. PCT/DE2008/001212, filed on Jul. 25, 2008.

FIELD OF THE INVENTION

The invention relates to a method for the continuous production of a multiaxial laid scrim web using at least one uniaxial laid scrim, which is wound about a winding apparatus for producing a substantially tubular multiaxial laid scrim. The invention further relates to an apparatus for carrying out the method according to the invention.

The term "uniaxial laid scrim" according to the present invention relates to a fiber material made of thin fibers, which are arranged in parallel with one another and have a common orientation in a particular preferred direction. Advantageously, the particular fibers of the fiber material are disposed next to one another, so that the uniaxial laid scrim has a thickness corresponding to the thickness of one such fiber, and furthermore has a width which corresponds to the number of the fibers disposed next to one another multiplied by their particular thickness. The fibers can thus be, for example, carbon fibers, glass fibers or similar, depending on the requirements for the respective product to be produced with the uniaxial laid scrim.

Furthermore, the designation "multiaxial laid scrim" characterizes a laid scrim made of fiber material including fibers, which are oriented in different directions. Like for the present invention, for example, a uniaxial laid scrim can be used, which is, for example, interwoven or superimposed and provided with fibers with different orientations. Such multiaxial laid scrim is generally produced as a web, which multiaxial laid scrim web can subsequently be wound onto a winder or stored in a different manner.

Such multiaxial laid scrims are also designated as technical textiles which have various applications. It is known for example to use multiaxial laid scrims for forming fiber reinforced components, like for example carbon fiber reinforced plastic components or glass fiber reinforced plastic components. Such fiber reinforced composite components are characterized in particular by excellent stability properties with low weight, which is particularly advantageous for using such composite components in ship and aircraft construction. On the other hand, multiaxial laid scrims can, for example, also be used as main components for bulletproof vests, which indicates the varied application spectrum of multiaxial laid scrims, for example, technical textiles.

Various methods are known in the prior art for producing multiaxial laid scrims, wherein some of these methods are different in principle. For example, methods are known, in which a uniaxial laid scrim is wound about a substantially plate shaped winding plane, wherein care has to be taken that the particular fibers of the uniaxial laid scrim do not get twisted or misaligned during the windup process, which would degrade the quality of the multiaxial laid scrim to be produced. Furthermore, misalignments and twisting can also occur when pulling the multiaxial laid scrim off such a winding plate, so that such a production process has to be modified in a rather complex manner to be able to produce a multiaxial laid scrim according to a particular quality standard.

An improved method is disclosed, for example, in the patent application publication DE 10 2005 000 115 A1, wherein two webs of a uniaxial laid scrim are wound about a third web of a uniaxial laid scrim, wherein the latter includes fibers, which extend in the extension direction of the multiaxial laid scrim web to be produced, and are continuously conveyed forward in this direction. This avoids having to pull a multiaxial laid scrim to be produced off from a winding plate, so that the associated disadvantages can be successfully avoided. However, it is a disadvantage of said method, that only multiaxial laid scrim webs with at least three laid scrim layers can be produced, so that a comparatively large amount of material has to be used, which furthermore disadvantageously increases the thickness of the multiaxial laid scrim web to be produced.

Furthermore, when winding about the uniaxial laid scrim web, which is aligned in the extension direction of the multiaxial laid scrim web, and which is also designated as 0° web, a contraction can occur at the edges of the 0° web through the uniaxial laid scrims, through which the 0° web is circum wound. These contractions are configured the stronger, the greater the feed angle between the supplied uniaxial laid scrims, circum winding the 0° web, and the 0° web which feed angle can be selected between 0° and 90°. Thus, it is evident that it is not possible through this method either, to produce a high quality multiaxial laid scrim web.

BRIEF SUMMARY OF THE INVENTION

Based on this prior art, it is the object of the present invention to provide a method for continuous production of a multiaxial laid scrim web, which can be produced at a high production speed, while maintaining high quality.

This object is accomplished according to the invention through a method for continuous production of a multiaxial laid scrim web including using at least one uniaxial laid scrim that is wound about a winding apparatus, in order to produce a substantially tubular multiaxial laid scrim, wherein the at least one uniaxial laid scrim is applied at least with a portion of its surface onto the winding apparatus and continuously transported into a feed direction through the winding apparatus, wherein at least one uniaxial laid scrim is wound about a winding apparatus in order to produce a substantially hose shaped multiaxial laid scrim. Advantageous embodiments of the method include:

- Two transport bands extending parallel to one another and offset from one another, so that a gap is left there between, are the winding apparatus.
- The at least one uniaxial laid scrim is supplied to the winding apparatus transversal to the feed direction.
- The two transport bands are at least partially formed from a nonstick material and/or provided with a nonstick coating.
- A thread grid provided with glue is supplied, which is placed between uniaxial laid scrims, which are disposed on top of one another.
- Glue is applied to the at least one uniaxial laid scrim during the supply of the at least one uniaxial laid scrim to the winding apparatus.
- The glue is thermally activated.
- The thermal activation is performed through calendering, wherein preferably an IR-heat source is used as a heat source.

A thermally activatable glue foil is introduced into the at least one multiaxial laid scrim parallel to the feed direction.

The at least one multiaxial laid scrim is stretched subsequent to the winding apparatus through a stretching apparatus, transversally, preferably perpendicular to the feed direction.

The stretching apparatus is configured by tension elements, which are essentially disposed extending parallel to the feed direction and on the sides of the transport bands, and are moved in feed direction together with the transport bands and thus deviated.

A distance between the tension elements is continuously increased to a predetermined dimension subsequent to the winding apparatus.

The stretching apparatus is formed by shaped bodies.

Lateral edges of the at least one multiaxial laid scrim are separated through a separation apparatus.

The distance between the tension elements is increased further up to a predetermined dimension after separating the lateral edges of the at least one multiaxial laid scrim.

The at least one multiaxial laid scrim is provided with holes.

Another uniaxial laid scrim or a differently configured material web is supplied parallel to the feed direction.

According to the invention, the production process is characterized in that the at least one uniaxial laid scrim is applied at least with portions of its surface onto the winding apparatus and continuously transported into a feeding apparatus through the winding apparatus. The flat application of the uniaxial laid scrim onto the winding apparatus assures that no entanglement or twisting of the fibers of the uniaxial laid scrim can occur during the subsequent feeding, so that a multiaxial laid scrim can be produced, which complies with the highest quality requirements. Even for relatively high feed velocities, the particular fibers of the uniaxial laid scrim are fed forward in the most uniform arrangement possible. Thus, this combination of continuous feeding and providing a safe and solid support for the uniaxial laid scrim provides a substantial advantage over the prior art method, so that a multiaxial laid scrim or a multiaxial laid scrim web can be produced with high speed and quality.

An advantageous embodiment of the invention provides that two transport bands are used as a winding apparatus, which transport bands are disposed extending parallel to one another at a distance from one another with a gap remaining there between. These transport bands provide the support surfaces for the uniaxial laid scrim, wherein the transport bands are operated counteracting. These transport bands have to be provided with suitable drive apparatuses and have a width that approximately corresponds to the width of a multiaxial laid scrim web to be produced. In order to further optimize the method, the velocity of the transport bands is tuned to the feed velocity for the at least one uniaxial laid scrim, so that tensions are avoided during the production as far as possible, which tensions could influence the fiber material of the uniaxial laid scrim negatively.

According to another advantageous embodiment of the invention, it is provided that the at least one uniaxial laid scrim is fed to the winding apparatus transversal to the feed direction. Thus, the uniaxial laid scrim can be fed to the winding apparatus at various directions, wherein e.g. an angle of 45° or 60° can be enclosed between the feed direction and the supply direction. The choice of angle depends on the requirements for the respective multiaxial laid scrim to be produced, and it depends on the particular conditions of the production process. Advantageously, two or more webs of a uniaxial laid scrim are provided to the winding apparatus, wherein an uniaxial laid scrim is placed onto the one transport band and the second uniaxial laid scrim is placed onto the other transport band, and these uniaxial laid scrims are fed through the counteracting configuration of the transport band into the same direction, this means into the extension direction of the multiaxial laid scrim laid scrim webs to be produced. Thus, the uniaxial laid scrims are stored on suitable storage units, like for example unwinding rolls.

Generally, winding the uniaxial laid scrims about the winding apparatus can be performed in various ways. In one embodiment, it is possible that storage units are moved about the winding apparatus in a circumferential manner, in particular about the feed direction defined by the winding apparatus, while the winding apparatus is held in place. The second option is that the storage units are held in place and that the winding apparatus is rotated instead about an axis disposed in feed direction approximately in the center with respect to the multiaxial laid scrim to be produced, so that the uniaxial laid scrim can be pulled off from the storage apparatus in this manner. Furthermore, there is the option that the storage apparatus move around the feed apparatus in a circumferential manner, while the winding apparatus simultaneously rotates about the rotation axis, wherein these movements have to be precisely adjusted to one another. Thus, it can be necessary that the storage units are also provided with a drive in order to facilitate a feeding of the uniaxial laid scrim to the winding apparatus, which is as precise and tension free as possible. It depends on the particular requirements and conditions which one of these configurations is selected for the production process according to the invention.

It is furthermore proposed that the transport bands are at least partially configured from a non-stick material and/or provided with a non-stick coating. This configuration of the transport bands has the advantage that uniaxial laid scrims placed onto the transport bands do not enter an adhesive connection with the surfaces of the transport bands where it is supported, which could lead to entanglement or twisting of the fiber material, which would impair the quality of the multiaxial laid scrim.

It is furthermore proposed that a thread grid configured with glue is supplied, which is placed between uniaxial laid scrims placed on top of one another. The thread grid can for example also be stored on a storage unit configured as an unwinding roll and can be pulled off there from, wherein the thread grid can be supplied to the winding apparatus, e.g. from the same direction as the uniaxial laid scrim. However, it is also conceivable that the thread grid is supplied to the winding apparatus from another direction, wherein the thread grid is also wound about the winding apparatus through the feeding and another uniaxial laid scrim can be placed over the thread grid, which can be glued together in this manner with a uniaxial laid scrim disposed under the thread grid. The threads of the thread grid are preferably provided with very little thickness in order not to increase the multiaxial laid scrim to be produced with respect to its thickness unnecessarily. Furthermore, suitable glue can be used, which can also be configured as a foil.

It is furthermore proposed that glue is applied to uniaxial laid scrims, while the uniaxial laid scrims are fed to the winding apparatus. This application of glue is preferably provided alternatively to using a thread grid provided with glue, wherein the glue is applied to the uniaxial laid scrim, for example through a pressure application roller, a spraying apparatus or similar. Also through this application of glue, subsequently, two layers of a uniaxial laid scrim are glued together.

The glue is advantageously thermally activated, so that its gluing properties only develop at a particular point in time, in order not to impair the manufacturing process prematurely, wherein for example a uniaxial laid scrim glues together with portions of the winding apparatus. The gluing of uniaxial laid scrims can also be performed at a point in time that is optimum for the manufacturing process, which simplifies performing the process.

It is furthermore proposed that the thermal activation of the glue is performed through calendering, wherein advantageously an IR-heating element is used as a heat source. Thus, through the calendering, the glue is activated in one aspect, and in another aspect, the uniaxial laid scrims are tightly compressed with the glue placed there between, so that an even and high quality connection is provided between the multiaxial laid scrims. Thus, a conventional calender can be used or calenders with heat sources disposed in their rollers, which can be configured as IR-heat sources in a relatively simple configuration, which load the enveloping surfaces of the calender with radiation in the infrared wavelength range in order to heat at least these enveloping surfaces. As an alternative to this configuration of the method, it can be provided that two additional transport bands are provided instead of a calender, which transport bands are also operated counteracting, and between which the multiaxial laid scrim is passed through and compressed, wherein these transport bands can also be heated in order to thermally activate the glue. The latter embodiment has the advantage that the uniaxial laid scrims contact the transport bands substantially with their entire surface, even after the winding apparatus and during the activation of the glue and during the connection of the uniaxial laid scrims, so that also here, the recited advantages with respect to continuous production of the laid scrims into a multiaxial laid scrim with high quality are provided. The transport bands can thus also be provided with an anti-adhesive layer as already described supra and/or they can be at least partially made of an anti-adhesive material, so that the static friction and also the dynamic friction between the fibers and the transport band surfaces are minimized as far as possible.

According to another advantageous embodiment of the invention, it is provided that, a glue foil, which can be thermally activated, is introduced into the multiaxial laid scrim parallel to the feed direction. This glue foil is used for connecting the uniaxial laid scrim supported on the upper transport band to the uniaxial laid scrim supported on the lower transport band, which connection is performed after the winding apparatus, wherein the supply of glue foil in feed direction can compensate to a small extent a tension possibly occurring in feed direction or in extension direction of the multiaxial laid scrim to be produced through calendering. The thermal activation of this glue foil can be performed as described supra through calendering or through arranging additional heatable transport bands.

Another advantageous embodiment of the invention provides that the multiaxial laid scrim is stretched behind the winding apparatus through a stretching apparatus in transversal direction, preferably perpendicular to the feeding direction. This is necessary because the winding apparatus has a finite thickness, whereby a joining of the uniaxial laid scrim supported on an upper transport band with the uniaxial laid scrim supported on a lower transport band has to be performed after the winding apparatus, wherein the fineness of the fiber or of the laid scrim can cause warped sections in the edge portion of the multiaxial laid scrim during joining, which warped sections e.g. subsequently pass through a calender, so that the multiaxial laid scrim web thus produced has rather low quality with respect to the configuration of the edges. A stretching apparatus is provided in order to overcome this problem, through which stretching apparatus the multiaxial laid scrim is stretched transversal to the feed direction, and thus, so that tensions in the multiaxial laid scrim are avoided as far as possible, which tensions can influence the quality of the laid scrim negatively. Thus, the stretching has the advantage that e.g. multiaxial laid scrims fed to the calender are included of two uniaxial laid scrims arranged at a relatively small distance from one another, so that no warping can occur in the edge portion and the calendering can be performed effectively.

It is furthermore advantageous when the stretching apparatus is configured through tension elements like for example cables, bands or wires, which are essentially, arranged extending parallel to the feed direction and on the side of the transport bands, and which are moved along in feed direction. The distance of these cables, bands or wires from one another can be selected in the portion of the winding apparatus, so that the uniaxial laid scrim, which is wound about the winding apparatus, does not contact the edge portions of the transport bands, but is fed at this location through the cables, bands or wires with the same velocity as the feed velocity of the transport bands, wherein the distance between the cables, bands or wires is selected slightly greater than the width of the transport bands for this purpose. These cables, bands or wires can additionally be roughened or configured in any other manner to provide some support to the fibers of the uniaxial laid scrims, which come in contact with the cables, bands or wires, for example. to prevent sliding. On the other side, it can be provided like for the transport bands that the cables, bands or wires are made from a nonstick material or provided with a nonstick coating.

In order to perform the stretching, it is provided that the distance between the cables, bands or wires is continuously increased to a predetermined dimension after the winding apparatus. The distance increase can be provided for example through pulleys, which divert the cables, bands or wires. The steady distance increase facilitates a stretching, which can be performed with as little tension with respect to the multiaxial laid scrim as possible in order not to influence the quality of the multiaxial laid scrim negatively. Furthermore, the distance is increased to a dimension which is preferably selected, so that the laid scrim is stretched in transversal direction relative to the feed direction, but not fed onward through the cables, bands or wires in taunt condition.

In order to remove the cables, bands or wires from the multiaxial laid scrim after stretching, a cutting apparatus can be provided, which cuts the edges of the multiaxial laid scrim open, after which the cables, bands or wires can for example be removed from the multiaxial laid scrim through additional distance increase. This cutting process can be performed before, simultaneously with, or after calendering. When the latter is the case, it can be provided that the enveloping surfaces of the calendering rollers are provided with circumferentially closed grooves, in which cables, bands or wires are run, so that no higher laminating pressure occurs in the multiaxial laid scrim in the portion of the cables, bands or wires, which would create a multiaxial laid scrim with uneven manufacture during calendering. Advantageously, the grooves are configured so that the forward feeding of the multiaxial laid scrim is performed, so that tensions in extension direction of the multiaxial laid scrim essentially occur only in the portion of the cables, bands or wires, and the portion of the multiaxial laid scrim disposed there between is fed forward essentially without tensions, which also influences the quality of a respective multiaxial laid scrim web positively. Furthermore, using two additional transport bands instead of the calender can be provided, so that these are also provided with respective recesses in the transport band surfaces in order to achieve the advantage recited supra.

As an alternative to the configuration of the stretching apparatus recited supra, the stretching apparatus can be configured according to another embodiment through shaped bodies, which are disposed subsequent to the winding apparatus, and which have a three-dimensionally shaped stretching surface, which facilitates stretching the multiaxial laid scrim, possibly without generating tensions in the multiaxial laid scrim. The material of these shaped bodies can be varied as described supra for the other components of the apparatus that come in contact with the laid scrim.

Another advantageous embodiment of the invention provides that the multiaxial laid scrim is provided with holes, which can be performed for example through a spiked roller or a needle bar. These holes subsequently help for example when manufacturing fiber reinforced composite components, so that a plastic or resin can penetrate better into the multiaxial laid scrim in order to permeate it to the fullest extent possible, in order to provide a component with even stability properties. Thus, a different hole pattern can be introduced into the multiaxial laid scrim according to particular requirements.

It is furthermore provided according to another advantageous embodiment of the invention that another uniaxial laid scrim or a material web with different configuration is supplied parallel to the feed direction. This additional uniaxial laid scrim or the material web can be supplied in the form of a 0° web, which is in particular suited to absorb tensions in feed direction of the multiaxial laid scrim, so that the quality of the multiaxial laid scrim is continuously high.

The object according to the invention is further achieved through an apparatus for the continuous production of a multiaxial laid scrim web, using at least one uniaxial laid scrim, which apparatus includes at least one storage unit for the uniaxial laid scrim and winding apparatus that perform a movement relative to one another to produce the multiaxial laid scrim. Further advantageous embodiments of the apparatus include:

- The transport band is at least partially made of a nonstick material and/or comprises a nonstick coating.
- The winding apparatus comprises two transport bands, which are disposed extending parallel to one another and offset from one another with a gap left there between.
- The uniaxial laid scrim is provided with a thread grid comprising glue.
- A spiked roller or a spraying apparatus, through which glue can be applied to the uniaxial laid scrim.
- The glue can be activated thermally.
- A calender, whose rollers preferably comprise an IR-heat source.
- A supply apparatus for supplying a thermally activateable glue foil, which can be introduced into the multiaxial laid scrim.
- A spiked roller or a needle bar.
- A stretching device.
- The stretching apparatus comprises two tension elements disposed essentially parallel to one another and extending on the sides of the transport bands.
- The stretching apparatus comprises pulleys.
- The stretching apparatus comprises shaped bodies.
- A supply apparatus for supplying another uniaxial laid scrim or a differently configured material web.

According to the invention, the winding apparatus includes at least one transport band, on which the at least one uniaxial laid scrim is supported with at least portions of its surface. This embodiment provides the advantage already recited with reference to the method according to the invention that the uniaxial laid scrim can also be fed with a high transport velocity without its even shaping being impaired. This facilitates producing a multiaxial laid scrim web with high production velocity and quality.

The transport band advantageously includes a nonstick coating and/or is at least partially made of a nonstick material in order to assure the lowest friction contact possible between the uniaxial laid scrim and the surface of the transport band.

It is furthermore proposed, that the winding apparatus includes two transport bands, which are disposed extending parallel to one another and offset from one another with a gap left there between. The transport bands are thus operated counteracting in order to transport a uniaxial laid scrim, which is in contact with a particular transport band, in feed direction continuously. The gap between the transport bands can for example be used for running a 0° web or a glue foil through the gap and into the multiaxial laid scrim created by the winding apparatus.

In order to glue the uniaxial laid scrims together, the uniaxial laid scrims can e.g. be provided with a thread grid including glue, or glue is for example applied to the uniaxial laid scrim by a coating roller or a spraying apparatus, wherein the glue can preferably be activated thermally. This thermal activation is preferably performed through a calender or through two heatable transport bands, wherein the calender rollers are heated for example through infrared radiation.

Furthermore, a stretching apparatus with two cables, bands or wires extending essentially parallel to one another at the sides of the transport bands are being proposed, through which cables, bands or wires, the multiaxial laid scrim is stretched with respect to its width before calendering or before being supported by the additional two transport bands, which prevents warping in the edge portion of the multiaxial laid scrim. Alternatively, the stretching apparatus can also include shaped bodies, which generate a stretching of the multiaxial laid scrim with the lowest tension possible. It is furthermore proposed that the apparatus includes a spiked roller or a needle bar, through which the multiaxial laid scrim is provided with holes in order to configure it with the best resin absorption possible, for example for resin drenching to be performed subsequently.

Furthermore, a supply apparatus for supplying another uniaxial laid scrim or a differently configured material web is provided, wherein the supply apparatus runs the other uniaxial laid scrim or the differently configured material web between the transport bands of the winding apparatus with the least contact possible, and subsequently runs it into the multiaxial laid scrim created by the winding apparatus.

BRIEF DESCRIPTION OF THE DRAWINGS

Other advantages and features of the present invention are subsequently described with reference to drawing figures, wherein.

DETAILED DESCRIPTION

Figure 1:
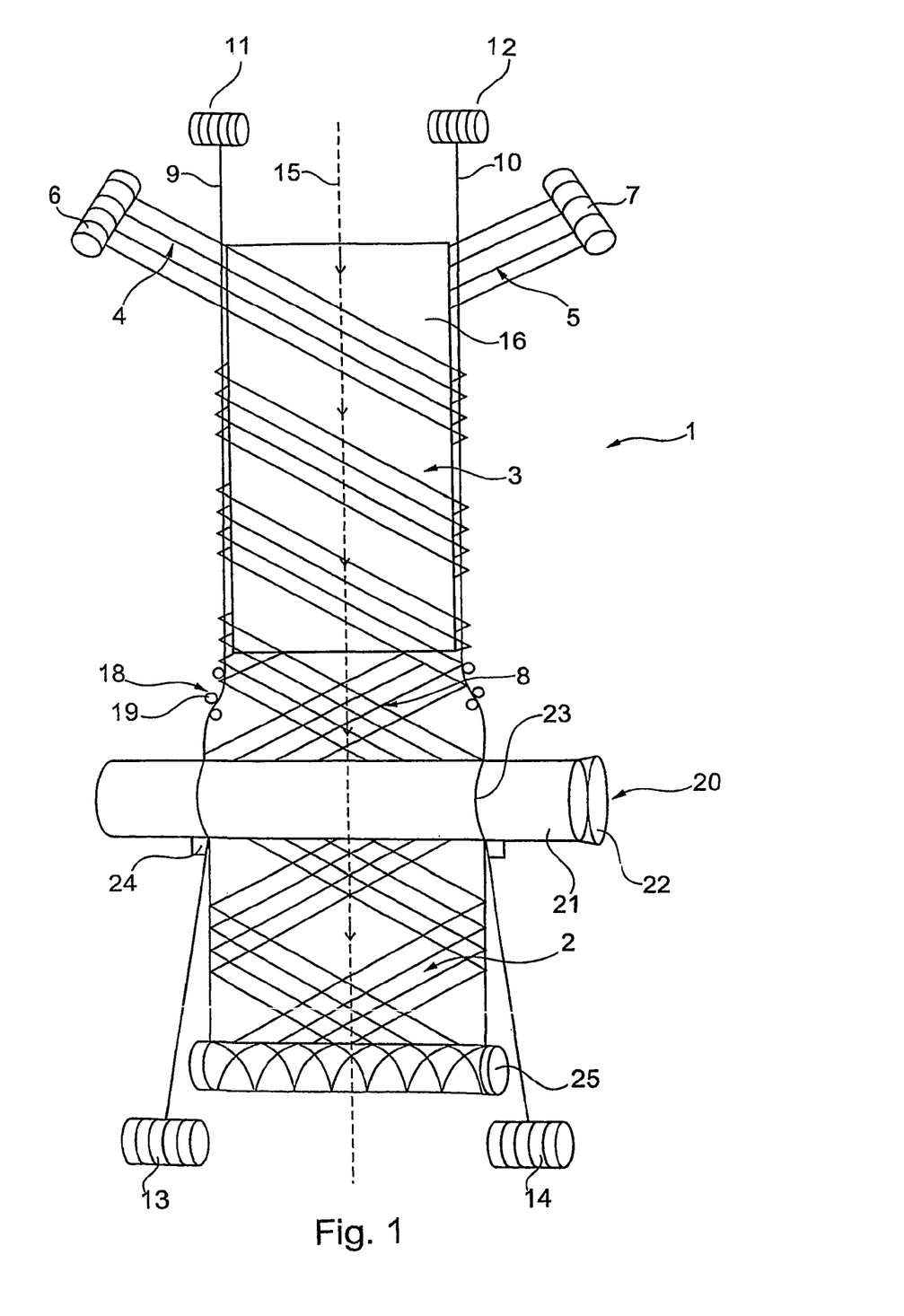
FIG. 1 schematically illustrates an embodiment of an apparatus according to the invention.

FIG. 1 illustrates an embodiment of an apparatus 1 according to the invention for continuous production of a multiaxial laid scrim 2. The apparatus 1 includes a winding apparatus 3, about which the uniaxial laid scrims 4 and 5 are wound for configuring a multiaxial laid scrim 8, wherein the uniaxial laid scrims 4 and 5 are pulled off for this purpose from storage units 6 or 7 and supplied to the winding apparatus 3. Tension elements 9 and 10 extend laterally besides the winding apparatus 3, which tension elements are configured e.g. as wires, which are respectively pulled off from storage units 11 or 12, and subsequently wound onto winding units 13 or 14. The winding about the winding apparatus 3 can be performed in that the storage units 6 and 7 are moved around the winding apparatus 3, and thus about the rotation axis 15, while the winding apparatus 3 is held in place. Winding about the winding apparatus 3, however, can also be performed in that the storage units 6 and 7 are being held in place, while the winding apparatus 3 rotates about the rotation axis 15. Furthermore, also a combination of these two configurations is possible, in which the storage units 6 and 7 and also the winding apparatus 3, rotate about the rotation axis 15, wherein the directions of rotation of the storage units 6 and 7 are contrary to the direction of rotation of the winding apparatus 3. Depending on requirements, one of these options can be selected for winding about the winding apparatus 3.

During winding about the winding apparatus 3, the uniaxial laid scrims 4 and 5 are placed onto two transport bands 16 and 17, of which only the transport band 16 is illustrated in FIG. 1, wherein the transport band 17 is disposed below the transport band 16 and parallel thereto. Through these transport bands 16 and 17, the uniaxial laid scrims 4 or 5, supported on the transport bands 16 and 17, are transported in a feed direction, which is indicated in FIG. 1 through the arrows along the rotation axis 15. Since the uniaxial laid scrims 4 and 5 additionally surround the tension elements 9 and 10 at the sides of the winding apparatus 3, the tension elements 9 and 10 are preferably being moved forward with the same velocity in the feed direction, as the transport bands 16 and 17 feed the uniaxial laid scrims 4 and 5 forward. Through the configuration of the winding apparatus 3 and using tension elements 9 and 10, disposed at the sides of the winding apparatus, it is facilitated to lay the uniaxial laid scrims 4 and 5 flat onto the winding apparatus 3, and to additionally prevent a contact of the uniaxial laid scrims 4 and 5 with the side portions of the transport bands 16 and 17 through the tension elements 9 and 10, so that the uniaxial laid scrims 4 and 5 can be transported in feed direction at a high transport velocity without misalignment or twisting, which could influence the quality of a multiaxial laid scrim 8 to be produced or of a multiaxial laid scrim web 2 in a negative manner. In order to improve the positive effects with respect to the configuration of the winding apparatus 3, the transport bands 16 and 17 are preferably made of a nonstick material and/or include a coating made of a nonstick material, which reduces the friction between the fibers of the uniaxial laid scrims 4 and 5 and the surfaces of the transport bands to the largest extent possible.

Figure 2:
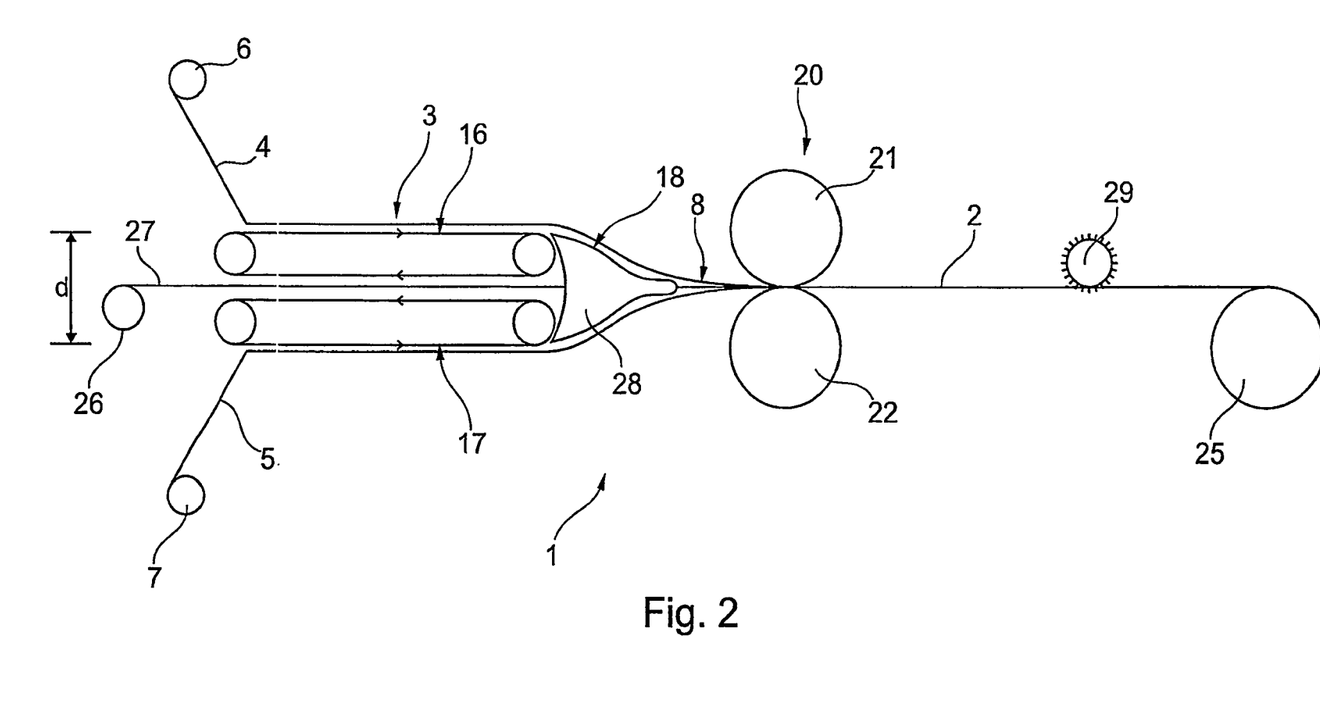
FIG. 2 schematically illustrates another embodiment of the apparatus according to the invention.

Since the winding apparatus 3 has a finite thickness d (re. FIG. 2), warping can occur in the edge portion of the multiaxial laid scrim 8 thus produced after the winding apparatus 3 when joining the uniaxial laid scrims supported on the transport bands 16 and 17, which uniaxial laid scrims are formed from the uniaxial laid scrims 4 and 5, wherein the joining is required in order to produce the multiaxial laid scrim 8 and to compact it in a calender 20. In order to prevent such distortions, a stretching apparatus 18 is disposed subsequent to the winding apparatus, which stretching apparatus is formed in the illustrated embodiment by several pulleys 19, which divert the tension elements 9 and 10, so that the distance between the two tension elements 9 and 10 continuously increases up to a predetermined dimension. This stretches the multiaxial laid scrim 8, wherein the stretching is advantageously performed, so that no tensions are generated in the multiaxial laid scrim 8. Thus, compacting the multiaxial laid scrim 8 can be performed through the calender 20, without the multiaxial laid scrim 8 being negatively influenced when supplied to the calender 20, which produces a multiaxial laid scrim with the highest quality possible and high production velocity.

The calender 20 includes heatable calender rollers 21 and 22, wherein heating the calender rollers 21 and 22 is used for thermally activating a glue, which joins the laid scrim supported on the transport band 16 with the laid scrim supported on the transport band 17. Such a glue can e.g. be applied to the one or both of the uniaxial laid scrims 4 and 5, for example through an application roller or a spraying apparatus, before the laid scrims are wound about the winding apparatus, or a thread grid with glue, also designated as an adhesive thread grid, is disposed at one or both uniaxial laid scrims 4 and 5.

Furthermore, there is the option indicated in FIG. 2 to introduce a glue foil configured as a 0° web, this means extending in the direction of the feed apparatus between the two transport bands 16 and 17, and to subsequently introduce it into the multiaxial laid scrim 8 at the winding apparatus 3. However, it is essential that glue is used that can be thermally activated, so that production is not impaired before calendering, for example through adherence of a uniaxial laid scrim 4 or 5 at a transport band 16 or 17. The activation is only performed in the calender 20, which can simplify the production process.

The calender rollers 21 and 22 have circumferential annular grooves 23 in their enveloping surfaces, in which grooves the tension elements 9 and 10 are supported. Thus, the multiaxial laid scrim 8 is not compressed stronger in the calender 20 in the portion of the edges of the laid scrim 8, this means in the portion where the tension elements 9 and 10 are disposed, than in the center portion, which would cause a multiaxial laid scrim web 2 with portions with differently processed portions, which means that such multiaxial laid scrim web 2 is not processed with constant high quality. The grooves 23 are advantageously configured, so that the tensions in feed direction in the multiaxial laid scrim 8 can be substantially received by the tension elements 9 and 10, so that the portion of the multiaxial laid scrim 8, which is centrally located between the tension elements 9 and 10, is transported with the lowest tension possible, which also contributes to increasing the quality of a multiaxial laid scrim web 2 to be produced.

In the illustrated embodiment, separation apparatuses 24 are disposed subsequent to the calender 20, which separation apparatuses are disposed respectively at the edges of the multiaxial laid scrim 8 and separate these edges subsequent to the calendering process, so that the tension elements 9 and 10 can be removed from the multiaxial laid scrim 8 for finishing the production of the multiaxial laid scrim web 2. This is performed in the illustrated embodiment in that the distance between the tension elements 9 and 10 increases subsequent to the separation apparatuses 24 up to a predetermined dimension, which is defined in this embodiment for the tension elements 9 and 10 through the positioning of the windup rollers 13 and 14. Additionally, it can be provided in a step subsequent to separating the edges that the tension elements 9 and 10 are cleaned from possible fiber material residuals, in order to reuse the tension elements 9 and 10 after a completed production process in another process cycle. As an alternative to this recycling method, it can also be provided that the tension elements 9 and 10 are configured in the form of endless bands, which are deviated by unwinding rollers 11 and 12, pulleys 19 and windup rollers 13 and 14.

As described supra, a multiaxial laid scrim web 2 is thus produced, which can be produced with high production velocity and quality and which is wound onto a storage roll 25 in finished state. The storage roll 25 can also generate a compression of the multiaxial laid scrim web 2 during windup of the multiaxial laid scrim web 2 in order to further compress it.

All illustrated rolls 6, 7, 11, 12, 13, 14 and 19 and the rollers 21 and 22 and the transport bands 16 and 17 of the winding apparatus 3 can be respectively provided with drive apparatuses, which are controllable for example through a control apparatus, so that an optimum adaptation of the particular movements can be performed with respect to the production process, which is used in particular for minimizing undesirable tensions in the uniaxial laid scrims 4 and 5, the multiaxial laid scrim 8 and the multiaxial laid scrim web 2. This illustrates that a multiaxial laid scrim web 2 can be continuously produced with high production velocity through the instant manufacturing process, wherein the multiaxial laid scrim web 2 furthermore has high quality compared to the prior art and can be produced in a relatively economical manner.

FIG. 2 provides a schematic illustration of an embodiment for an apparatus 1 according to the invention for continuous production of a multiaxial laid scrim web 2. This figure illustrates both transport bands 16 and 17, on which a uniaxial laid scrim 4 or 5 is transported in feed direction, wherein the laid scrims 4 and 5 are pulled off from storage units 6 or 7. Furthermore, a storage unit 26 is illustrated, from which a glue foil 27 is pulled off that can be thermally activated, and which is run through the gap between the transport bands 16 and 17, and which is compressed in the calender 20 subsequent to the winding apparatus 3 and the stretching apparatus 18 together with the uniaxial laid scrims 4 and 5. Instead of a glue foil, it can also be provided that an adhesive thread grid, another uniaxial laid scrim, or a differently configured material web is pulled from the storage unit 26, which can be inserted into the multiaxial thread 8, for example for compensating tensions. It can be derived from the arrows drawn at the transport bands 16 and 17, that the transport bands 16 and 17 are operated counteracting, wherein the transport band 16 is operated clockwise and the transport band 17 is operated counterclockwise. The gap between the transport bands 16 and 17 should be sufficient to facilitate an optimum touch free pass-through of the glue foil 27 through this gap.

It can be furthermore provided that the transport bands 16 and 17 are covered in the gap through a shielding element, so that the glue foil 27 cannot come in contact with the transport bands 16 and 17. This is particularly advantageous, when a respective apparatus 1 is exposed to functional vibrations or other movements during operation, which can be generated e.g. through rotating movements of the winding apparatus 3.

What is evident in particular from FIG. 2, is that the finite thickness d of the winding apparatus 3 is necessary thereafter in order to join the uniaxial laid scrims 4 and 5 towards the calender 20, so that no material distortions occur in the edge portion of the multiaxial laid scrim 8, which would subsequently be compressed in the calender 20 and thus would cause a multiaxial laid scrim web 2 with inferior quality. In order to improve this joining, a stretching apparatus 18 is provided in FIG. 2 as an alternative to FIG. 1, which stretching apparatus is configured at the edges as a shaped body 28 configured subsequent to the transport bands 16 and 17. The shaped bodies 28 comprise a three-dimensionally configured surface, which causes the joining of the uniaxial laid scrims 4 and 5 through a stretching of the multiaxial laid scrim 8 as illustrated in FIG. 1, wherein the shaped bodies are configured, so that creating tensions in the multiaxial laid scrim 8 is avoided to the largest extent possible. Advantageously, the shaped bodies 28 are provided with a nonstick coating and/or are made of a nonstick material, so that the fibers of the multiaxial laid scrim 8 can slide along the three-dimensionally configured surfaces with the lowest friction possible, without getting twisted or misaligned. In order to generate a stretching of the multiaxial laid scrim 8 that corresponds to FIG. 1, the right portion of the illustrated shaped body 28 is disposed according to the lower pulleys 19 illustrated in FIG. 1, further away from the respective portion of a shaped body 28 positioned at the opposite edge of the winding apparatus 3, than the left portion of the shaped body 28 illustrated in FIG. 2. The shaped bodies 28 are thus respectively only disposed at the edges, preferably only in a lateral extension subsequent to the winding apparatus 3, so that the glue foil 27 can be transported without interference between them and into the multiaxial laid scrim 8.

The multiaxial laid scrim 8 is compressed again subsequent to the stretching apparatus 18 through a calender 20. Since no tension elements 9 and 10 are provided in this embodiment shown in FIG. 2, the disposition of separation apparatuses 24 can be omitted, since no tension elements 9 and 10 have to be removed from the multiaxial laid scrim 8. Before the multiaxial laid scrim web 2 thus produced is wound onto the storage roller 25, the multiaxial laid scrim web 2 is provided with holes through a spiked roller 29, in order to improve e.g. the penetration of resin for a subsequent production of a fiber reinforced composite component. As an alternative to the spiked roller 29, also a needle bar or similar can be used for making holes in the multiaxial laid scrim web 2.

Figure 3:
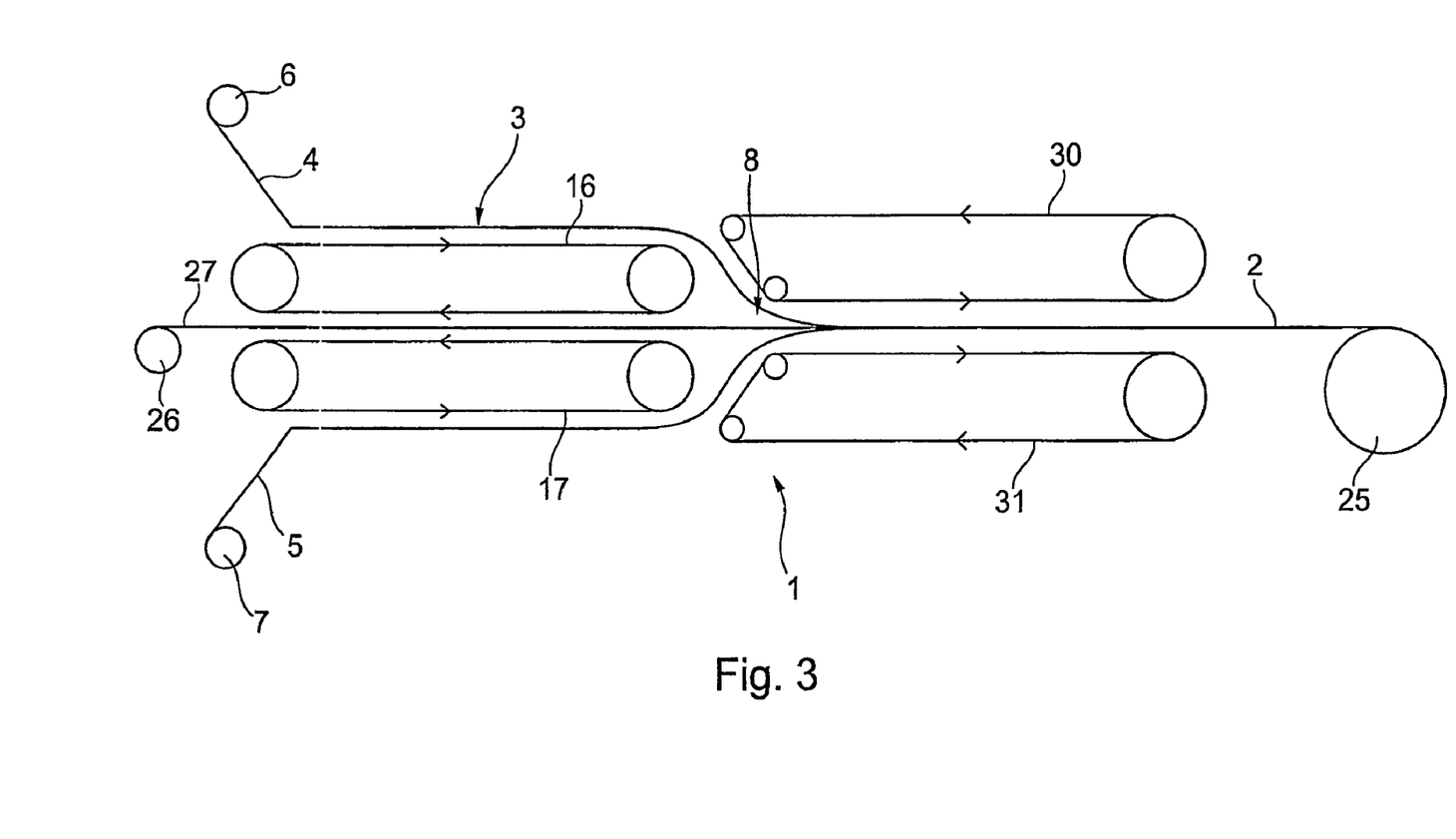
FIG. 3 schematically illustrates an embodiment of the apparatus according to the invention, in which transport bands are being used, instead of a calender.

FIG. 3 schematically illustrates another alternative embodiment of the apparatus 1. For this apparatus 1, two additional transport bands 30 and 31 are provided instead of the calender 20, through which the multiaxial laid scrim 8 is compressed, wherein the transport bands 30 and 31 can be configured heatable, so that e.g. for supplying a glue foil 27 to the multiaxial laid scrim 8, a thermal activation of this glue foil can be performed during the compression between the transport bands 30 and 31. As illustrated in FIG. 3, the transport band 30 is operated counterclockwise and the transport band 31 is operated clockwise in order to feed the multiaxial laid scrim 8 forward. This use of additional transport bands 30 and 31 facilitates, on the one hand, running the process with high velocity, and provides the advantage on the other hand, that the multiaxial laid scrim 8 is evenly compressed over a large surface, which can be advantageous as opposed to using a calender 20, in which the compression portion is essentially configured line shaped. The distances between the transport bands 16 and 17, on the one hand, and the transport bands 30 and 31, on the other hand, can be adapted according to the respective conditions and requirements, wherein in particular the thickness d of the winding apparatus 3 has to be considered in order to facilitate an ideal process execution with optimum production quality. It can certainly also be provided for the embodiment illustrated in FIG. 3 for an apparatus 1 according to the invention, that a stretching apparatus 18 is disposed, which prevents distortions in the edge portion of the multiaxial laid scrim 8.

It is evident from the preceding description that a continuous manufacturing process can be provided through the method according to the invention and the associated apparatus 1, which process is greatly improved over the prior art and facilitates continuous production of a multiaxial laid scrim web 2 with high velocity and high quality by using transport bands 16, 17, 30 and 31 and a stretching apparatus 18, which provide the essential advantages according to the invention.

The embodiments described with reference to the figures are descriptive and not limiting.

REFERENCE NUMERALS AND DESIGNATIONS 1 apparatus
2 multiaxial laid scrim web
3 winding apparatus
4 uniaxial laid scrim
5 uniaxial laid scrim
6 storage unit
7 storage unit
8 multiaxial laid scrim
9 tension element
10 tension element
11 storage unit
12 storage unit
13 windup unit
14 windup unit
15 rotation axis
16 transport band
17 transport band
18 stretching apparatus
19 pulley rollers
20 calender
21 calender roller
22 calender roller
23 groove
24 separation apparatus
25 storage roll
26 storage unit
27 glue foil
28 shaped body
29 spiked roller
30 transport band
31 transport band
d thickness

What is claimed is:

1. An apparatus for continuous production of a multiaxial laid scrim web using at least one uniaxial laid scrim, comprising:
at least one storage unit for the uniaxial laid scrim and a winding apparatus,
wherein the at least one storage unit and the winding apparatus perform a movement relative to one another for producing a multiaxial laid scrim,
wherein the winding apparatus includes at least one transport band revolving in a closed loop, on which transport band the at least one uniaxial laid scrim is supported at least along portions of its surface, and
wherein the at least one transport band remains separate from the multiaxial laid scrim produced.

2. An apparatus according to claim 1, wherein the transport band is at least partially made of a nonstick material or a nonstick coating.

3. An apparatus according to claim 1, wherein the winding apparatus comprises two transport bands, which are disposed extending parallel to one another and offset from one another with a gap left there between.

4. An apparatus according to claim 1, wherein the uniaxial laid scrim is provided with a thread grid comprising glue.

5. An apparatus according to claim 1, comprising a spiked roller or a spraying apparatus, through which glue can be applied to the uniaxial laid scrim.

6. An apparatus according to claim 4, wherein the glue can be activated thermally.

7. An apparatus according to claim 1, comprising a calender, whose rollers include an infrared heat source.

8. An apparatus according to claim 1, comprising a supply apparatus for supplying thermally activateable glue foil, which can be introduced into the multiaxial laid scrim.

9. An apparatus according to claim 1, comprising a spiked roller or a needle bar.

10. An apparatus according to claim 1, wherein a stretching device includes two tension elements disposed at a distance from one another that increases up to a predetermined dimension and wherein the two tension elements extend on the sides of the transport bands.

11. An apparatus according to claim 1, wherein the stretching apparatus comprises pulleys.

12. An apparatus according to claim 1, wherein the stretching apparatus comprises shaped bodies.

13. An apparatus according to claim 1, comprising a supply apparatus for supplying another uniaxial laid scrim or a differently configured material web.

* * * * *